United States Patent
Lorca Hernando (10) Patent No.: US 9,923,703 B2
(45) Date of Patent: Mar. 20, 2018

(54) METHOD, SYSTEM AND DEVICES FOR REDUCING INTERFERENCES IN OFDMA WIRELESS COMMUNICATION NETWORKS

(71) Applicant: Telefonica, S.A., Madrid (ES)

(72) Inventor: Javier Lorca Hernando, Madrid (ES)

(73) Assignee: Telefonica, S.A. (ES)

( * ) Notice: Subject to any disclaimer, the term of this patent is extended or adjusted under 35 U.S.C. 154(b) by 75 days.

(21) Appl. No.: 15/051,042

(22) Filed: Feb. 23, 2016

(65) Prior Publication Data

US 2016/0269165 A1 Sep. 15, 2016

(30) Foreign Application Priority Data

Mar. 4, 2015 (EP) ...................... 15382096

(51) Int. Cl.
*H04J 3/00* (2006.01)
*H04L 5/00* (2006.01)
(Continued)

(52) U.S. Cl.
CPC .......... *H04L 5/0073* (2013.01); *H04J 11/005* (2013.01); *H04J 11/0023* (2013.01);
(Continued)

(58) Field of Classification Search
CPC . H04L 5/0073; H04L 27/2634; H04L 5/0019; H04L 27/26; H04L 1/0071;
(Continued)

(56) References Cited

U.S. PATENT DOCUMENTS 9,532,333 B2 * 12/2016 Hammarwall ........ H04L 1/0026
2007/0149249 A1 * 6/2007 Chen ...................... H04L 1/0026 455/561

(Continued)

FOREIGN PATENT DOCUMENTS

WO 2011079294 A1 6/2011

OTHER PUBLICATIONS

Hauwei, "CSI-RS design to support multiple-cell measurement", 3GPP draft, R1-101058 CSI RS Design to Support Mulitple-Cell Measurement, 3rd Generation Partnership Project, Mobile Competence Centre, France vol. RAN WGI no. San Francisco CA, Feb. 16, 2010.

(Continued)

*Primary Examiner* — Chuong T Ho
(74) *Attorney, Agent, or Firm* — Hayes Soloway PC

(57) ABSTRACT

A system and method for reducing interferences in OFDM networks comprising
generating (31) a set of pseudo-random coordination patterns $\{k_i^n; i=0, \ldots, N-1; n=0, \ldots, M-1\}$, wherein $k_i^n$ are integers from 0 to M-1, M is the number of calls in a coordination cluster, N is the number of subcarriers, n is a cell identifier within the coordination cluster, and $k_i^n \neq k_i^m \forall n \neq m, i=0, \ldots, N-1$;
generating a randomizing pattern common to all cells within the coordination cluster, comprising an invertible transformation in the time domain of the complex symbols for each subcarrier;
spreading (32) the complex symbols over M TTIs:

$$b[i,m] = M \sum_{m=0}^{T-1} a[i,n] \exp[-j2\pi(Mn+k_i) \cdot m/(M \cdot T)].$$

wherein a[i,n] denotes the symbols prior to the spreading (32), b[i,m] denotes the symbols after the spreading (32), $0 \leq k_i \leq M-1$, $i=0, \ldots, N-1$, $m=0, \ldots, T \cdot M-1$;
scrambling (34) the spread symbols b[i,m] to all the cells within the coordination cluster; and (Continued)

mapping (35) the scrambled symbols over all the N subcarriers in the frequency domain and M consecutive TTIs in the time domain.

8 Claims, 10 Drawing Sheets

(51) Int. Cl.
| | |
|---|---|
| *H04W 16/24* | (2009.01) |
| *H04L 1/00* | (2006.01) |
| *H04J 11/00* | (2006.01) |
| *H04L 25/03* | (2006.01) |
| *H04J 13/00* | (2011.01) |
| *H04L 27/26* | (2006.01) |
| *H04W 84/04* | (2009.01) |
| *H04W 92/20* | (2009.01) |

(52) U.S. Cl.
CPC ........ *H04J 13/0003* (2013.01); *H04L 1/0071* (2013.01); *H04L 5/0019* (2013.01); *H04L 25/03866* (2013.01); *H04L 27/26* (2013.01); *H04L 27/2634* (2013.01); *H04W 16/24* (2013.01); *H04L 5/005* (2013.01); *H04L 5/0007* (2013.01); *H04W 84/042* (2013.01); *H04W 92/20* (2013.01)

(58) Field of Classification Search
CPC . H04L 25/03866; H04L 5/0007; H04L 5/005; H04J 11/005; H04J 13/0003; H04J 11/0023; H04W 84/042; H04W 16/24; H04W 92/20
USPC .................................................. 370/336, 335
See application file for complete search history.

(56) References Cited

U.S. PATENT DOCUMENTS

| | | |
|---|---|---|
| 2010/0142466 A1 | 6/2010 | Palanki et al. |
| 2015/0131604 A1* | 5/2015 | Hammarwall ........ H04L 1/0026 370/330 |

OTHER PUBLICATIONS

L Hanzo, M. Munster, B.J. Choi, T. Keller, OFDM versus MC-CDMA1, Jun. 1, 2004, Wiley, England, Chapter 8.

\* cited by examiner

METHOD, SYSTEM AND DEVICES FOR REDUCING INTERFERENCES IN OFDMA WIRELESS COMMUNICATION NETWORKS

FIELD OF THE INVENTION

The present invention has its application within the telecommunication sector, especially, deals with the field of interference minimization in Orthogonal Frequency-Division Multiple Access (OFDMA) wireless communication systems and, in particular, in Long-Term Evolution (LTE) networks.

More specifically, the present invention proposes a system and a method to minimize the inter-cell interferences experienced by users' devices (e.g. LTE terminals) located at cell edges in OFDM wireless communications.

BACKGROUND OF THE INVENTION

Orthogonal Frequency-Division Multiple Access (OFDMA) is a proven access technique for efficient user and data multiplexing in the frequency domain. One example of a system employing OFDMA is Long-Term Evolution (LTE), LTE is the next step in cellular Third-Generation (G) systems, which represents basically an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses, scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. Other wireless standards like WiFi (IEEE 802.11) or WiMAX (IEEE 802.16) also employ OFDMA.

One of the most serious issues when deploying single-frequency wireless Orthogonal Frequency Division Multiplexing (OFDM) networks is the increased interference suffered by users at the cell edges which require specialized techniques. One of the simpler approaches is so-called inter-Cell Interference Coordination (ICIC), wherein frequency resources are statically partitioned into several "chunks" designated for different cells as disclosed in "LTE, the UMTS Long Term Evolution: From Theory to Practice", John Wiley & Sons (2nd edition), p. 28, 2011.

Other more advanced approaches include semi-static tinge-domain and/or frequency domain coordination of the cells, in such a way that time and/or frequency resources are coordinated among a given cluster of neighbour cells so as to avoid interferences towards a given user. These approaches give rise to either Carrier Aggregation-based enhanced Inter-Cell Interference Coordination (CA-eICIC), or Almost Blank Subframes-based enhanced Inter-Cell Interference Coordination (ABS-eICIC), both described in "LTE, the UMTS Long Term Evolution: From Theory to Practice", John Wiley & Sons (2nd edition), p. 701, 2011.

Previous solutions suffer the drawback of how large the coordination cluster should be. Too large clusters lead to very high complexity in resources, coordination (as well as signalling exchange between cells), while smaller clusters lead to suboptimal performance and significant inter-cluster interference. In addition, interference from cells outside any coordination cluster will destroy part of the expected advantage if it is received with sufficiently strong signal level.

CA-based eICIC solutions require at least two component carriers to be aggregated at the receiver side, and do not foresee coordination beyond two neighbour cells unless complex combinations of frequency bands are allowed. ABS-based eICIC suffers the drawback of requiring complex patterns of muted/unmuted subframes that may not scale with increasingly larger clusters. Moreover, cells not operating in ABS mode will cause harmful interference as their transmission occasions will fully collide with those of the protected subframes.

Solutions based on successive interference cancellation (SIC) at the receivers are mainly focused on interference cancellation of control channels, as these have a known structure and do not require additional signalling from the network. However data channels can present multiple formats depending on multi-antenna use, modulation and coding scheme, etc. and thus require significant signalling from the network for the receivers to perform SIC. This translates into higher complexity at the device side as well as lower chances to cancel interference beyond one or two dominant interferers.

Other solutions belong to so-called Coordinated Multi-Point (CoMP) techniques, where data-plane transmission or reception from/to multiple cells is coordinated so as to avoid interferences. The main difference with respect to ICIC/eICIC solutions is that the former ones involve the data plane while the latter ones only deal with the control plane. Data plane coordination is much more costly in terms of network resources and information exchange between the network nodes, thus leading to complex solutions. In addition, interference from cells outside a coordination cluster is very difficult to mitigate.

Therefore, there is a need in the state of the art for more efficient ways to deal with inter-cell interference in order to enable low-complex inter-cell interference coordination in OFDM wireless networks.

SUMMARY OF THE INVENTION

The present invention solves the aforementioned problems and overcomes previously explained state-of-art work limitations by providing a precoding mechanism to be applied over the time-frequency resources of a set of cells (in what follows denoted as "coordination cluster") in an OFDM wireless system, in order to cancel inter-cell interference within the cluster and minimize interferences from other clusters and from other uncoordinated cells.

The proposed precoding mechanism involves spreading and scrambling of the complex baseband symbols over a number of consecutive time transmission intervals (TTIs), in such a way that, when undone at the receiver side, signals from the cells within the same cluster appear orthogonal to each other and inter-cell interference is thus removed.

At the same time, and in contrast to prior art techniques, interference from other cells outside a given coordination cluster will be reduced because the proposed method also protects the signals from any interference caused by uncoordinated transmissions. Protection is seen in this case as a signal-to-noise ratio (SNR) improvement which is experienced at the receive side when the proposed precoding is undone.

The scenario for application of the proposed invention is a wireless OFDM network (e.g., LTE network) comprising a number of cells and suffering from significant inter-cell interference at the cell boundaries. The proposed invention can be applied in homogeneous scenarios comprising macro cells, or in heterogeneous scenarios comprising, a mixture of macro, micro and/or pico cells as deployed in hotspots in order to increase capacity.

The cost of the proposed precoding mechanism is a reduced bit rate (due to the spreading operation) and increased air-interface latency (because of the prolonged transmission time required to decode a single transmission). However these are not strong requirements as users, at the cell edges usually suffer from reduced bit rates because of the strong interference, and the present invention can improve detection by removing inter-cell interference within the cluster as well as minimizing the effect, of external interferences. The increased air-interface latency is comparable to some coverage extension techniques based on repetition (like TTI bundling in LTE), and represents a small fraction of the end-to-end delay compared to the combined effect of L1/L2 retransmissions, scheduling delays, and transport over the backhaul and, core networks, among others.

In the context of the invention, the following concepts are used:
Coordination cluster: set of cells in which transmissions are to be coordinated for inter-cell interference avoidance within the duster, and for protection against interference from other clusters and from uncoordinated cells.
Coordination pattern; pseudo-random pattern to be used by the cells belonging to a coordination cluster in order to avoid inter-cluster interference.
Randomizing pattern: pseudo-random pattern to be used by the cells belonging to a coordination cluster in order to reduce interferences from other clusters and from other uncoordinated cells.

According to a first aspect of the present invention, a method for reducing interferences in OFDMA wireless networks, wherein transmissions between at least one user equipment and multiple base stations belonging to different cells suffer from inter-cell interferences, is disclosed and comprises the following steps:
1. for reducing interferences in Orthogonal Frequency Division Multiplexing wireless networks, the method comprising:
grouping a plurality of cells into coordination clusters defined as non-overlapping sets of cells, wherein each cluster comprises a number of cells whose transmissions are synchronized in the time domain;
for each of the coordination clusters, generating a set of pseudo-random coordination patterns $\{k_i^n; 0, \ldots, N-1; n=0, \ldots, M-1\}$, wherein $k_i^n$ are integers from 0 to M−1, M is the number of cells in the coordination cluster, N is the number of subcarriers being transmitted, n is a cell identifier within the coordination cluster, and $k_i^n \neq k_i^m \forall n \neq m, i=0, \ldots, N-1$;
for each of the coordination clusters, generating a randomizing pattern common to all cells within the coordination cluster, the randomizing pattern comprising an invertible transformation of the complex symbols in the time domain along M consecutive transmission time intervals for each subcarrier;
applying, by each, cell within the coordination cluster, a spreading operation of the complex symbols over M consecutive transmission time intervals (TTIs) for each subcarrier according to the expression:

$$b[i, m] = M \sum_{n=0}^{T-1} a[i, n]\exp[-j2\pi(Mn + k_i) \cdot m/(M \cdot T)],$$

wherein T is the number of complex symbols in a TTI, a[i,n] denotes the complex symbols prior to the spreading operation and b[i,m] denotes the complex symbols after the spreading operation, $k_i$ are integers comprising the coordination pattern of the cell with $0 \leq k_i \leq M-1$, and i, m are indices given by $i=0, \ldots, N-1$, $m=0, \ldots, T \cdot M-1$;
applying, by each cell within the coordination cluster, an invertible scrambling operation of the spread complex symbols b[i,m] over M consecutive TTIs in the time domain for each subcarrier, the scrambling operation being given by the randomizing pattern and common to all the cells within the coordination cluster; and
mapping the scrambled complex symbols over all the N subcarriers in the frequency domain and M consecutive TTIs in the time domain, obtaining precoded complex symbols, after the spreading and the scrambling operations, which are mapped on M·T consecutive resources in the time domain for each subcarrier.

In a second aspect of the present invention, a system comprising at least one user equipment and a plurality of base stations belonging to different cells, is disclosed for reducing inter-cell interference in OFDMA wireless networks, the system further comprising means for implementing the method described before, which are
a) At least a Base Station comprising:
a generator of coordination clusters for grouping the multiple cells into coordination clusters defined as non-overlapping sets of cells, wherein each cluster comprises a number of cells whose transmissions are synchronized in the time domain, selecting a set of pseudo-random coordination patterns $\{k_i^n; i=0, \ldots, N-1; n=0, \ldots, M-1\}$ wherein $k_i^n$ are integers from 0 to M−1, M is the number of cells in the coordination cluster, N is the number of subcarriers being transmitted, n is a cell identifier within the coordination cluster, and $k_i^n \neq k_i^m \forall n \neq m, i=0, \ldots, N-1$;
a generator for selecting a randomizing pattern, for each generated coordination cluster, the randomizing pattern being common to all cells within the coordination cluster and comprising an invertible transformation of the complex symbols in the time domain along M consecutive TTIs for each subcarrier;
a spreader for applying, for each cell within the coordination cluster, a spreading operation of the complex symbols over M consecutive TTIs for each subcarrier according to the expression:

$$b[i, m] = M \sum_{n=0}^{T-1} a[i, n]\exp[-j2\pi(Mn + k_i) \cdot m/(M \cdot T)],$$

wherein T is the number of complex symbols in a TTI, a[i,m] denotes the complex symbols prior to the spreading operation (32), b[i,m] denotes the complex symbols after the spreading operation (32), $k_i$, are integers comprising the coordination pattern of the cell with $0 \leq k_i \leq M-1$, and i, m are indices given by $i=0, \ldots, N-1$, $m=0, \ldots, T \cdot M-1$;
a scrambler for applying, for each cell within the coordination cluster, an invertible scrambling operation of the spread complex symbols b[i,m] over M consecutive TTIs in the time domain for each subcarrier, the scrambling being given by the randomizing pattern and common to all the cells within the coordination cluster;

means for mapping the scrambled complex symbols over all the N subcarriers in the frequency domain end M consecutive TTIs in the time domain, obtaining precoded complex symbols to be mapped on M·T consecutive resources in the time domain for each subcarrier, b) At least a user equipment comprising:

means for de-mapping operation the precoded complex symbols received by the user equipment from M consecutive TTIs collected for each of the subcarriers of the coordination cluster, de-scrambling means for applying the following inverse transformation:

$\hat{b}[i,m] = c[i, o^{-1}(i,m')] \exp(-j\varphi[i, o^{-1}(i,m')])$, wherein $o^{-1}(i,m)$ denotes the inverse of said interleaver pattern, $\hat{b}[i,m]$ are the estimated complex symbols after undoing the scrambling operation, $m' = o(i,m)$, and $c[i,m]$ are the received complex symbols de-spreading means for applying the following inverse transformation to obtain estimated complex symbols $\hat{a}[i,n]$ with a signal to noise ratio improved by a factor M:

$$\hat{a}[i,n] = \sum_{n=0}^{M \cdot T - 1} \hat{b}[i,m] \exp[j2\pi(Mn + k_i) \cdot m/(M \cdot T)].$$

wherein $\hat{b}[i,m]$ are the estimated complex symbols after undoing the scrambling operation.

In a last aspect of the present invention, a computer program is disclosed, comprising computer program code means adapted to perform the steps of the described method, when said program is run on processing means of a network entity (base station or user terminal) of a OFDMA network, said processing means being a computer, a digital signal processor, a field-programmable gate array (FPGA), an application-specific integrated circuit (ASIC), a micro-processor, a micro-controller, or any other form of programmable hardware.

The method in accordance with the above described aspects of the invention has a number of advantages with respect to prior art which can be summarized as follows:

The proposed invention allows for reduced inter-cell interferences in OFDM wireless networks, as physical layer transmissions are modified by the cells within a coordination cluster in such a way that inter-cell interference can be avoided and user experience can be greatly enhanced. A number of coordination clusters can be defined wherein the associated signalling exchange reduces to agreeing on a set of coordination and randomizing patterns, thus avoiding any user-plane data exchange between network nodes. A precoding operation is proposed so that the signals received from different cells are orthogonal and do not interfere with each other within the coordination cluster.

In contrast with prior art techniques, like CA-based eICIC, ABS-based eICIC or CoMP, where interference from uncoordinated cells is not avoided in traditional time-domain and/or frequency-domain coordination strategies, the present invention also protects transmissions from interferences caused by cells within other coordination clusters and from uncoordinated cells which are not applying the proposed invention. The proposed precoding, when undone at the receive side, can boost the desired signal's level in relation to the interference level in a factor given by the coordination cluster size, and reception can thus be greatly improved. This makes the task of dimensioning the coordination clusters less critical compared to prior art solutions where inter-cluster interference cannot be avoided.

The proposed invention provides a coordination mechanism that does not require the schedulers to be coordinated within the clusters. On contrary to other known solutions, transmissions need not be aligned in the frequency domain and the proposed precoding can be applied over the resources allocated for cell-edge users suffering from heavy inter-cell interference. Thus, the present invention can be applied on a per-user basis so as to protect the signals intended for cell-edge users who are suffering from significant, interference. Moreover, transmissions from different cells belonging to a coordination cluster need not be aligned in the frequency domain for this invention to be applicable. The present invention obtains transmissions towards different users which are orthogonal inside the coordination cluster irrespective of whether the corresponding allocated resources are aligned in the frequency domain or not.

Coordination of the cells can be achieved by the present invention with very limited signaling exchange between the involved nodes (or between them and a central node), avoiding the massive, exchange of data plane information that would otherwise require high-capacity backhaul links. Configuration of the clusters can be performed semi-statically through Operation and Maintenance (O&M) in a centralized way, or by using Self-Organizing Networks (SON) techniques.

These and other advantages will be apparent in the light of the detailed description of the invention.

DESCRIPTION OF THE DRAWINGS

For the purpose of aiding the understanding of the characteristics of the invention, according, to a preferred practical embodiment thereof and in order to complement this description, the following figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-10.

In the context of the invention, a coordination cluster is defined as a set of cells whose transmissions are to be coordinated. The cluster size, denoted by M, determines the number of TTIs over which the proposed precoding method of the invention can be applied. In what follows it is assumed that the nodes comprising the coordination cluster are phase-synchronized in the time domain, in such a way that transmissions from the cells belonging to a coordination cluster take place at synchronized time instants.

Figure 1:
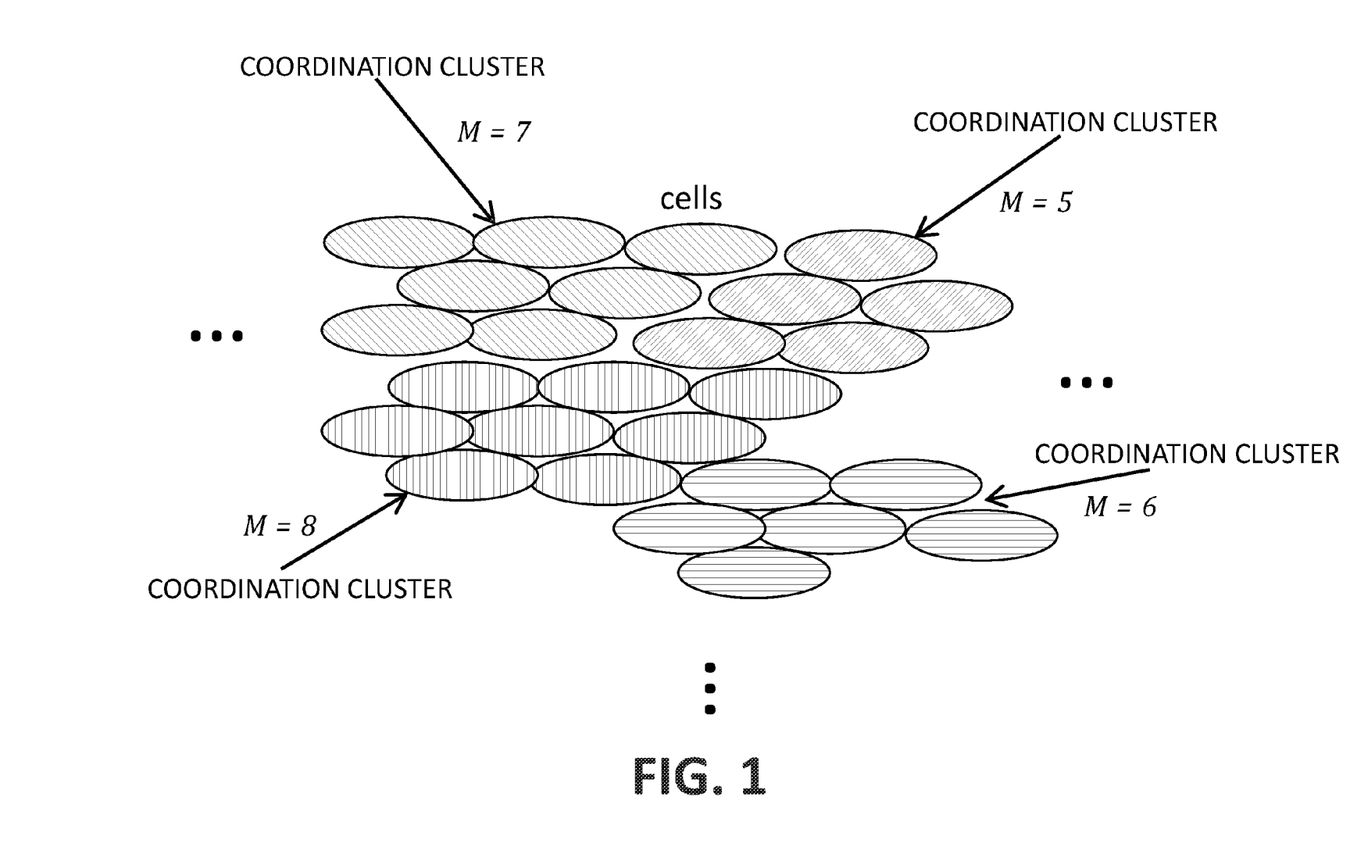
FIG. 1 shows a schematic diagram of different cell sets forming coordination clusters, in accordance with a possible application case of the invention.

FIG. 1 presents several examples of coordination clusters with different cluster sizes (M): M=5, M=6, M=7 and M=8.

Multiple cells are first grouped into a number of coordination clusters, each comprising several cells whose transmissions are to be coordinated. Cells within a coordination cluster are assumed to be phase-synchronized, in such a way that transmissions take place at synchronized time instants according to a common phase reference. A proposed precoding operation comprising, in turn, spreading and scrambling operations, is applied by the transmitters of the cells in such a way that the desired signals are protected from interferences caused by the other cells within the cluster. Therefore, users connected to any cell belonging to a cluster experience virtually no interference from the other cells in the cluster. At the same time, interference from cells belonging to other clusters is minimized by virtue of the different precoding operations performed in each cluster, as described below. Interference from cells not belonging to any coordination cluster can also be minimized.

For each of the defined coordination clusters, the proposed precoding operation comprises selecting a set of pseudo-random coordination patterns $\{k_i^n; i=0, \ldots, N-1; n=0, \ldots, M-1\}$, wherein $k_i^n$ are integers from 0 to M−1 and $k_i^n \neq k_i^m \forall n \neq m, i=0, \ldots, N-1$, M is the number of cells in the coordination cluster, i.e., the cluster size as defined before, N is the number of subcarriers and n is a cell identifier within the coordination cluster.

Figure 2:
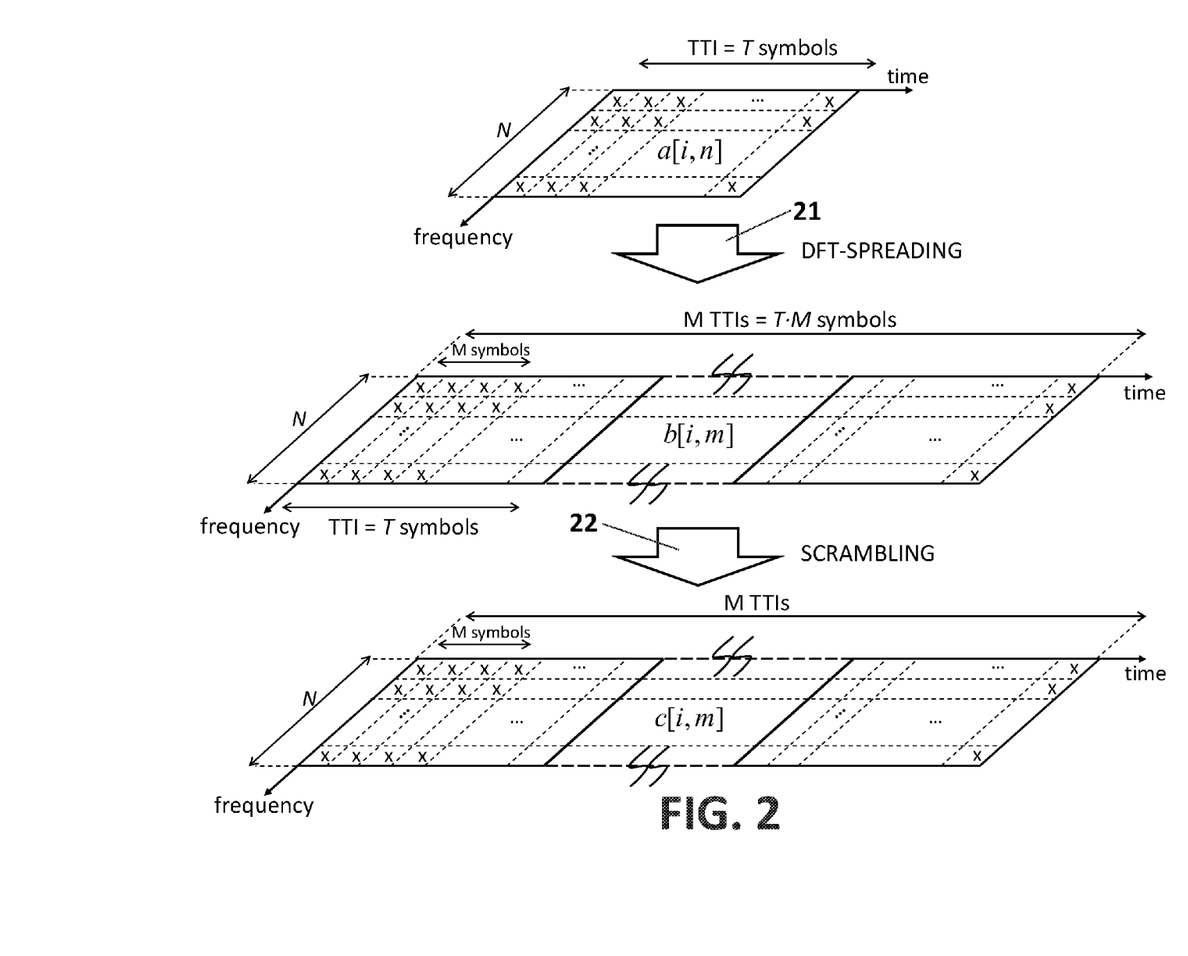
FIG. 2 shows a schematic diagram of the basic precoding operations for reducing inter-cell interference, according to a preferred embodiment of the invention.

The basic TTI structure of the transmissions in OFDM comprises N subcarriers in the frequency domain (as allocated to a given user) and a number T of OFDM symbols in the time domain, thus leading to N×T physical resource elements as shown in FIG. 2. The complex information symbols a[i,n] are transformed by a DFT-Spreading operation (21) that spreads the symbols over the M TTIs in the time domain, in such a way that each cell within the cluster will undergo a different precoding operation according to a pseudo-random pattern. A scrambling operation (22) then follows in the time domain which is characteristic of the coordination cluster and randomizes the complex symbols along the M TTIs. The combined operation, when undone by a receiver, will lead to orthogonal reception of the signals from the cells within the cluster thus avoiding inter-cell interference. Additionally, the effect of interferences from cells outside the coordination cluster will be reduced thanks to the scrambler. After determining the most suitable size of the coordination cluster, the cells within the cluster have to agree on a set of orthogonal pseudo-random patterns to use for the spreading operation. There are a large number of available orthogonal patterns and selection can be based upon the cell identities or any other cell-dependent parameter. Orthogonality of the spreading operation ensures ideally perfect protection within the cluster, while the subsequent scrambler minimizes the interference caused by other clusters and other uncoordinated cells. This is in contrast with prior art techniques where interference from uncoordinated cells is not avoided in traditional time-domain and/or frequency-domain coordination strategies, like CA-based eICIC, ABS-based eICIC or CoMP.

As shown in FIG. 2, each cell within a coordination cluster applies a spreading operation (21) of the OFDM complex symbols over M consecutive TTIs for each subcarrier in accordance with the expression:

$$b[i,m] = M \sum_{n=0}^{T-1} a[i,n] \exp[-j2\pi(Mn+k_i) \cdot m/(M \cdot T)],$$

wherein a[i,n] denotes the complex baseband symbols prior to precoding, b[i,m] denotes the spread complex precoded symbols, $k_i$ are integers comprising the coordination pattern of said cell with $0 \leq k_i \leq M-1$, and the indices i, m are given by $i=0, \ldots, N-1, m=0, \ldots T \cdot M-1$.

Afterwards, as shown in FIG. 2, each cell within a coordination cluster applies an invertible scrambling operation (22) of each spread complex symbols given by a randomizing pattern over M consecutive TTIs in the time domain for each subcarrier. This scrambling operation (22) is common to all the cells within said coordination cluster and involves an interleave pattern o(i,m) and a phase rotation pattern φ[i,m] which are characteristic of the coordination cluster, according to the following expression:

$$c[i,m] = b[i,o(i,m)] \exp(j\varphi[i,m]),$$

wherein m and o(i,m) are integers from 0 to M·T−1, i=0, ..., N−1, b[i,m] are the complex symbols after said spreading operation, and c[i,m] are the complex symbols after scrambling.

Figure 3:
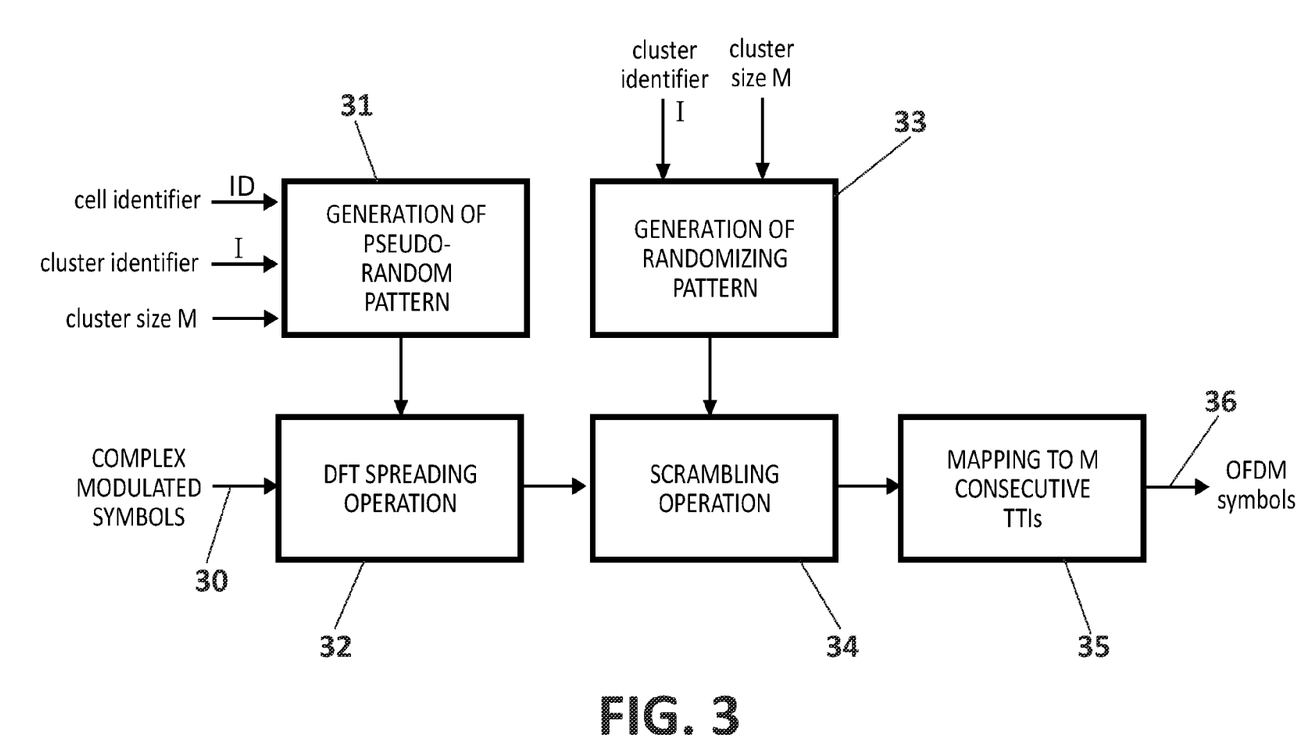
FIG. 3 shows a block diagram of a method of precoding OFDM symbols for reducing inter-cell interference performed by a base station belonging to a coordination cluster, in accordance with a possible embodiment of the invention.

FIG. 3 illustrates the basic operations to be applied by the base stations belonging to a given coordination cluster. Cells and clusters are both assumed to be characterized by suitable identifiers which may be assigned upon initial configuration of the network. Firstly, a pseudo-random pattern is generated (31) based on the physical cell identifier (ID), the cluster identifier (I) and the cluster size (M). The complex baseband modulated symbols (30) are received by the base station and it performs as DFT-spreading operation (32) that converts them into a set of complex baseband symbols spanning M consecutive TTIs. A randomizing pattern is generated (33) based on the cluster identifier (I) and cluster size (M) and a scrambling operation (34) of the DFT-spread symbols is performed according to the generated randomizing pattern. For each generated coordination cluster, a randomizing pattern is selected which is common to all cells within the cluster and comprises an invertible transformation of the OFDM complex symbols in the time, domain along M consecutive TTIs for each subcarrier, wherein said transformation can involve permutations, phase rotations or any other invertible transformation of the elements according to a pseudo-random pattern. Finally the precoded symbols are mapped (35) to M consecutive TTIs for conversion to OFDM symbols (36) in the time domain by means of standard OFDM techniques. The precoding operation spreads the symbols in the time domain prior to mapping them to OFDM time-frequency resources. Denoting T as the number of OFDM symbols in a TTI, the precoding operation spreads the symbols over M consecutive TTIs according to a Discrete Fourier Transform, DFT. The number of subcarriers in each OFDM symbol, N, remains unchanged. The DFT nature of the precoding operation results in a periodical pattern of symbols being apparent in the time domain for each of the subcarriers, which is undesirable in the presence of interference from other clusters. The subsequent scrambling operation destroys this periodical pattern according to a pseudo-random randomizing pattern which is characteristic of the coordination cluster. Different clusters will have different randomizing patterns. This will destroy the observable repetitions caused by the spreading operation (32) and protect transmissions against interferences from other clusters.

This proposed precoding operation is invertible. Thus, at the receiver side, the proposed precoding procedure can be undone and, as a result of this undo, it is obtained that the interference signals from neighbor cells within the cluster are orthogonal to the desired signal. At the same time, interferences from other cells belonging to other clusters, and from uncoordinated cells, appear as random noise while the desired signal is received with reinforced SNR.

In the first step for reducing the inter-cell interference performed at the base station, pseudo-random pattern is generated (31). Each cell within the cluster is characterized by this pseudo-random coordination pattern, which is chosen prior to any precoding operation. The coordination pattern for a transmission occupying N subcarriers comprises N integers, from 0 to M−1, that correspond to time offsets to be applied to the complex baseband symbols (30) as part of the DFT spreading operation (32):

$$Cell_j \rightarrow \{k_i^j \in [0, M-1], \forall i=0, \ldots, N-1\} = \{k_0^j, k_1^j, \ldots, k_{N-1}^j\},$$

where $k_i^j$ represents an integer time offset to be applied by cell j at subcarrier i, and N is the number of subcarriers allocated for transmission. Cells belonging to the same coordination cluster are characterized by orthogonal coordination patterns, in such a way that the time offsets for each subcarrier are different at the two cells:

$$(Cell_n, Cell_m) \in cluster \Rightarrow k_j^n \neq k_j^m \, \forall n \neq m, \, i=0, \ldots, N-1.$$

Cells belonging to a cluster of size M have to agree on the coordination pattern to be used by each cell. There are $M^N$ possible coordination patterns within a cluster of size M. However not all of them are orthogonal, and once a pattern is picked by a first cell in the cluster, there will be $(M-1)^N$ remaining patterns which are orthogonal to the first one. After a second cell selects one of these remaining patterns, there will be $(M-2)^N$ orthogonal patterns for the third cell to choose from, and this procedure can continue until the last cell in the cluster picks the only orthogonal pattern still available in the cluster.

A mechanism can therefore be devised such that cells in the cluster sequentially select orthogonal patterns from a first to a last cell (in any particular order). Pattern selection may be based on the physical cell identifier (ID) of one of the cells in the cluster, or any other strategy provided that it yields different orthogonal patterns for different cells. Given the huge number of possible sequences, the probability that two cells belonging to different clusters choose the same pattern is negligible.

As an example, in the case that the coordination cluster has length M=4 and there are only N=4 subcarriers allocated for transmission, omitting, the cell index j, one possible set of time offsets to be applied for a given cell can be:

$$\{k_i\} = \begin{pmatrix} 0 \\ 0 \\ 0 \\ 0 \end{pmatrix}, \begin{pmatrix} 1 \\ 2 \\ 3 \\ 1 \end{pmatrix}, \begin{pmatrix} 3 \\ 1 \\ 2 \\ 2 \end{pmatrix}, \begin{pmatrix} 2 \\ 3 \\ 1 \\ 3 \end{pmatrix}.$$

However many other possibilities exist while keeping the same choice for the first cell, e.g.:

$$\{k_i\} = \begin{pmatrix} 0 \\ 0 \\ 0 \\ 0 \end{pmatrix}, \begin{pmatrix} 1 \\ 1 \\ 1 \\ 1 \end{pmatrix}, \begin{pmatrix} 2 \\ 2 \\ 2 \\ 2 \end{pmatrix}, \begin{pmatrix} 3 \\ 3 \\ 3 \\ 3 \end{pmatrix}.$$

Selection can be based on the cell identities of any of the cells within the cluster, or in any other criteria. Given the semi-static nature of the resources coordination, selection can be performed in a centralized way by any suitable network entity like e.g. the Operations Support System, OSS, or other similar entities.

Figure 4:
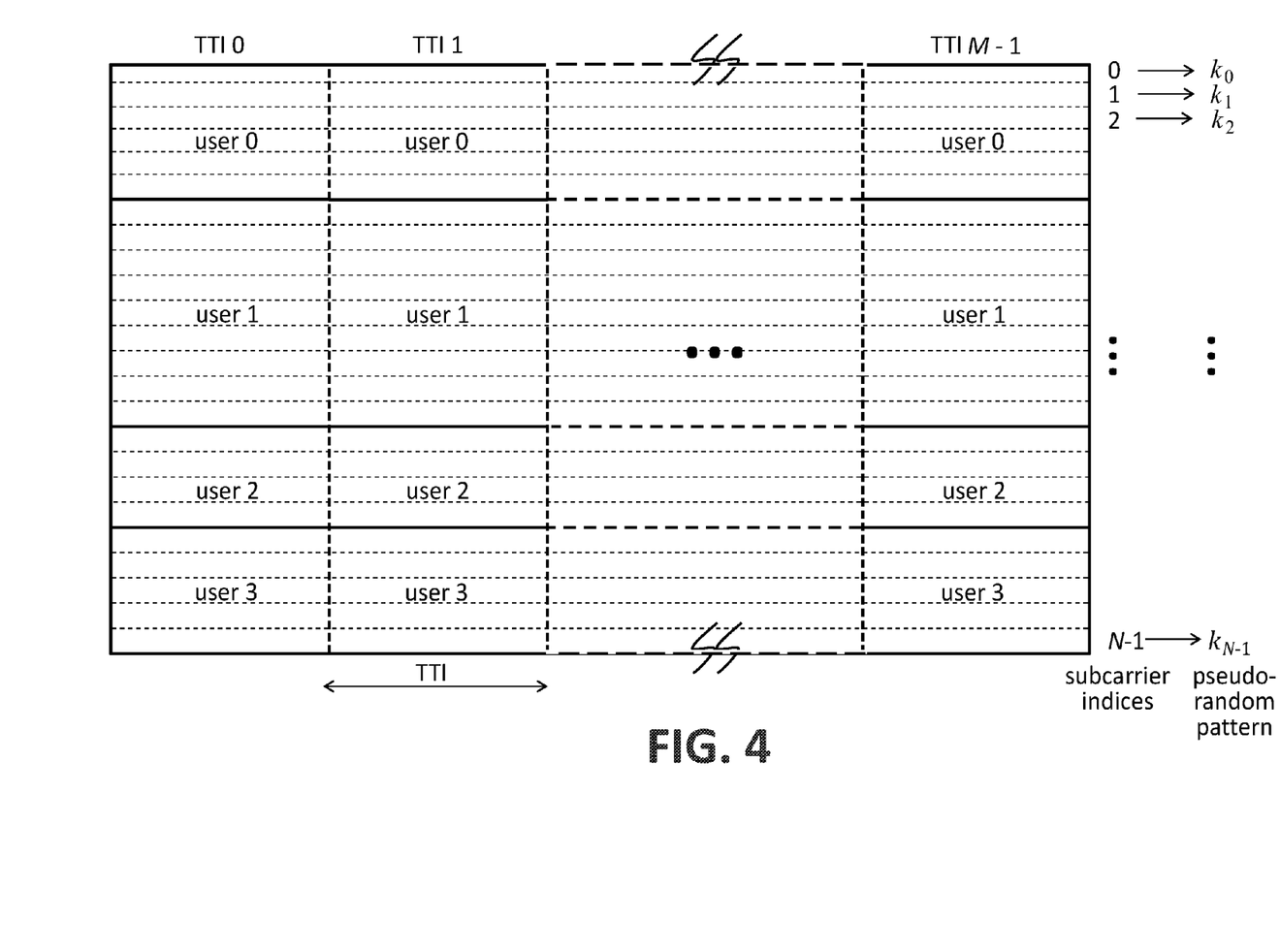
FIG. 4 shows a schematic diagram of a pseudo-random coordination pattern as a function of the subcarrier index applicable to all users in a Transmission Time Interval, in accordance with a possible application case of the invention.

A problem arises when different transmissions in a cell occupy different sets of subcarriers. In this case there should be as many different pseudo-random patterns as transmissions are scheduled in a given TTI, each of them with possibly different numbers of subcarriers, thus complicating the pattern selection. It is therefore more convenient to consider N as the number of subcarriers in the whole system bandwidth, so that transmissions undergo pseudo-random patterns that depend only on the subcarrier indices in the frequency domain. This is illustrated in FIG. 4 with an example of four users in a given TTI, whose transmissions are spread along M TTIs, with a pseudo-random pattern uniquely determined by the subcarrier indices for each of the users.

Figure 5:
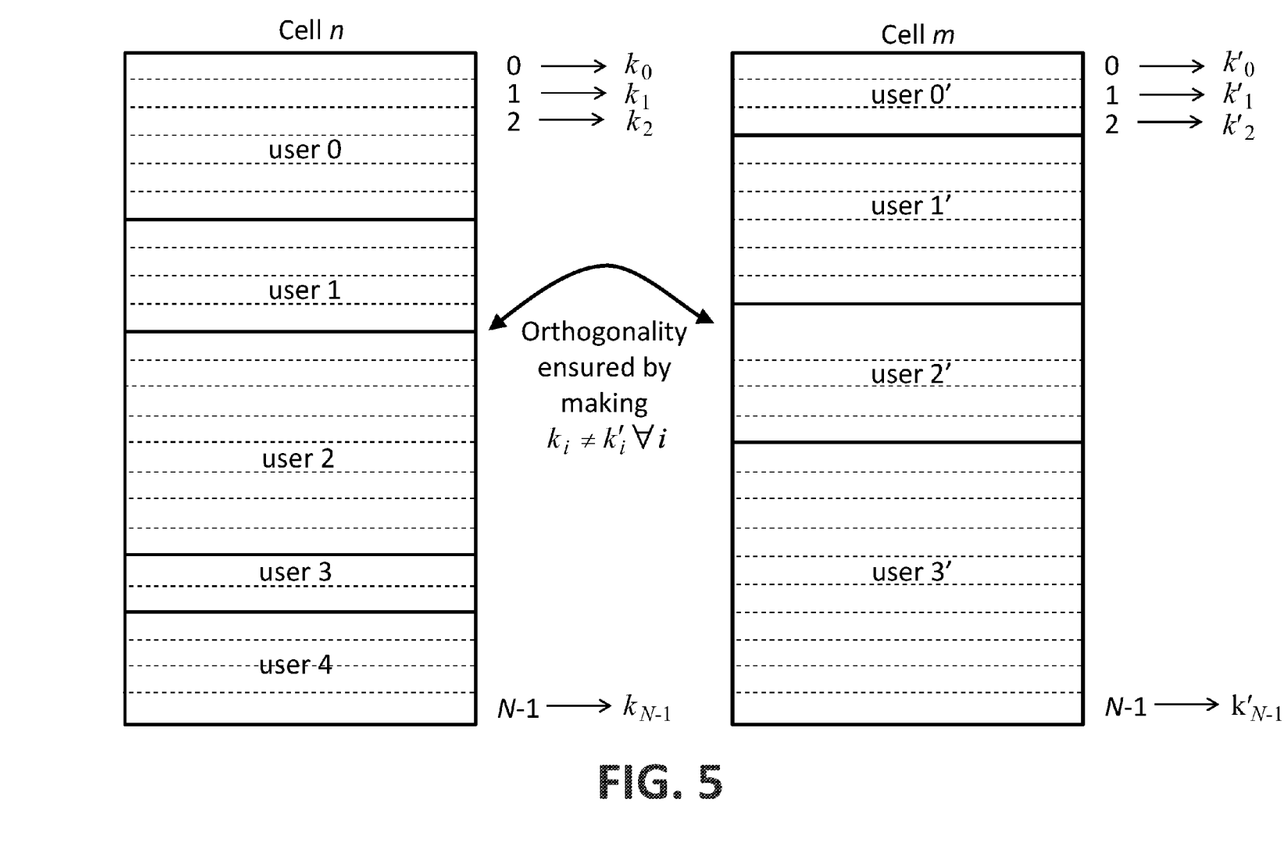
FIG. 5 shows a schematic diagram of two different cells from the same coordination cluster with transmitting users nonaligned in the frequency domain, in accordance with another possible application case of the invention.

Subcarriers scheduled for a given user could be either localized or distributed in the frequency domain, and, in any case transmissions from different cells will remain orthogonal provided that the coordination patterns are orthogonal across the whole system bandwidth. Moreover, transmissions from different cells within a cluster need not be aligned in the frequency domain. FIG. 5 illustrates this point where two cells belonging to the same cluster will remain orthogonal provided that the pseudo-random patterns $k_i$ and $k_i'$, have different values for all subcarriers i=0, 1, . . . , N−1, irrespective of the misalignment of their respective transmissions in the frequency domain.

Figure 6:
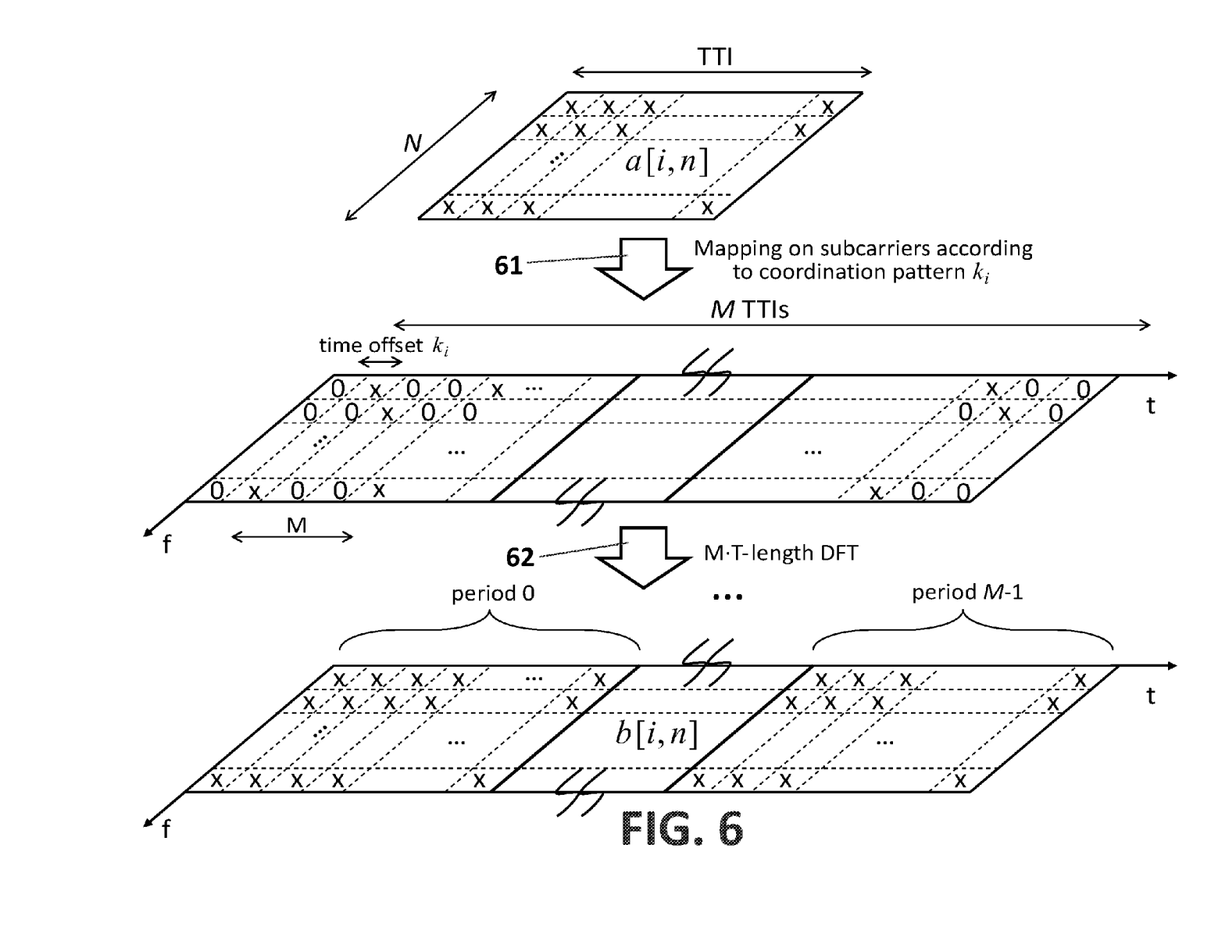
FIG. 6 shows a schematic diagram of the DFT spreading operation, according a possible embodiment of the invention.

The DFT spreading operation (32), illustrated in FIG. 6, takes the following form omitting the cell index for ease of notation:

$$b[i, m] = M \sum_{n=0}^{T-1} a[i, n] \exp[-j2\pi(Mn + k_i) \cdot m / (M \cdot T)],$$

where a[i,n] denotes the complex baseband symbols prior to spreading, b[i,m] denotes the complex spread symbols, $k_i$ are integers comprising the coordination pattern with $0 \leq k_i \leq M-1$, and the indices i, m are given by i=0, . . . , N−1, m=0, . . . , M·T−1. Spreading takes the form of a M·T-length DFT of the complex baseband samples after mapping to periodical positions in the time domain, with period M and offsets given by $\{k_i\}$ for each subcarrier i. This operation can be performed without resorting to the use of Fast Fourier Transforms (FFT), given the small length T (e.g. equal to 14 in LTE) that leads to low-complexity calculations.

The information symbols a[i,n] are first mapped (61) on every Mth subcarrier (leaving M−1 nulls between each pair of non-null consecutive subcarriers) and then DFT-transformed (62) over the M TTIs. In the figure the time-frequency resources with non-null transmission are marked with an "x", while resources with null transmissions are marked with a "0". Prior to the DFT, the signal is concentrated on only 1/Mth of the available subcarriers, so the power spectral density can be increased by a factor M without changing the overall transmit, power (hence the factor M in the above equation). The coordination pattern $\{k_i\}$ determines the time offsets to be applied on each subcarrier i. After the DFT the spectral density will be, reduced because the energy will be spread over the M TTIs. This fact will reduce the interference towards other cells.

At the receiver side, the spreading operation can be undone by applying the following inverse DFT transformation:

$$\hat{a}[i, n] = \sum_{m=0}^{M \cdot T-1} b[i, m] \exp[j2\pi(Mn + k_i) \cdot m / (M \cdot T)] = M \cdot a[i, n],$$

which leads to the estimated original information symbols â[i,n] with SNR improved by a factor M.

The DFT spreading operation (32) spreads the complex symbols over M consecutive TTIs for each subcarrier, appearing as M periods of a complex sequence of symbols with period T for each subcarrier. This repetition pattern is undesirable because it will also be applicable to any interference from a cell belonging to a different cluster, and interference will thus be reinforced after de-spreading the signal upon reception. The scrambling operation (34) described below destroy this periodicity in order to minimize inter-cluster interference.

Figure 7:
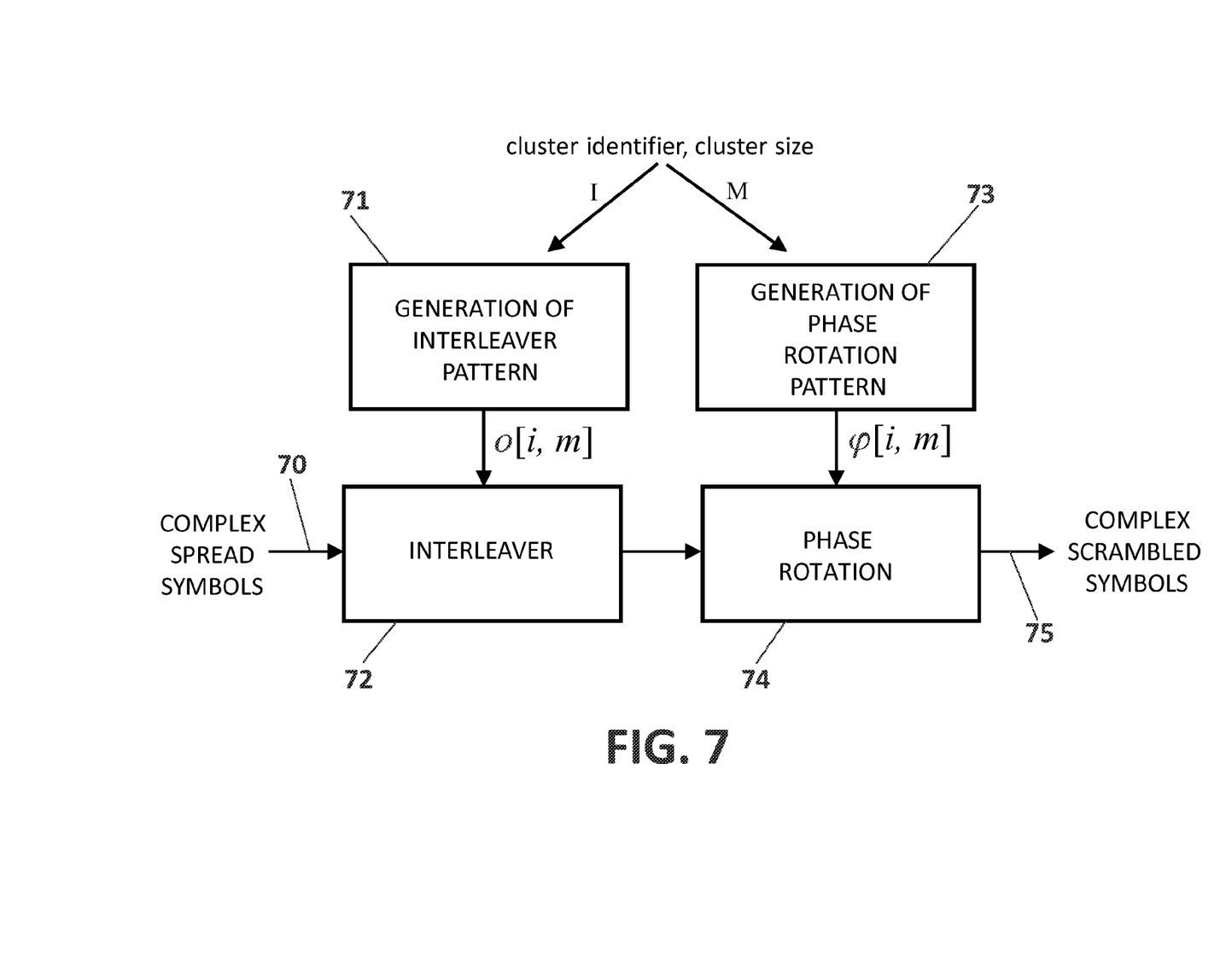
FIG. 7 shows a block diagram of steps carried out by a base station a scrambling operation, according to a possible embodiment of the invention.

After the spreading operation, a scrambling operation (34) is performed by the base station over the resulting complex symbols prior to the mapping (35) to OFDM resources in order to destroy the repetition pattern observed in the time domain for each subcarrier. A scrambler in the base station transform the symbols into a seemingly random sequence that would only be invertible inside the coordination cluster, thus appearing as random sequences outside it. FIG. 7 illustrates the steps of a possible scrambling procedure (34).

Many possibilities can be identified for the scrambling operation (34). As an example, it can comprise an interleaver (72) followed by a phase rotation stage (74) in order to randomize the complex symbols. The interleaving operation (72) can be any invertible permutation of indices according to the expression:

$$\{m\} \xrightarrow{interleaving} \{o(i, m)\},$$

where m and o(i,m) will be integers from 0 to M·T−1.

For this interleaving (72), previously, the base station generates (71) an interleaver pattern o(i,m) that depends on the cluster size (M) and the cluster identifier (I), thus yielding different interleaving patterns for each of the clusters.

The resulting complex baseband symbols b[i,m'] are therefore obtained by:

$$b[i,m'] = b[i,o(i,m)],$$

where m'=o(i,m) are integers from 0 to M·T−1.

The phase rotation stage (74) then applies a known pseudo-random sequence of phase rotations $\varphi[i,m]$ so as to destroy any correlation between the complex symbols, thus yielding the scrambled symbols c[i,m']:

$$c[i,m'] = b[i,o(i,m)] \exp(j\varphi[i,m']).$$

A phase rotation pattern $\varphi[i,m]$ is generated (73) by the base station, being also dependent on the cluster identifier (I) and cluster size (M).

Rotations will be undone at the receiver by applying the negative phases $-\varphi[i,m]$. The de-interleaving operation at the receive side can recover the original indices from the interleaved ones, $o^{-1}(o(i,m))=m$, and therefore:

$$\hat{b}[i,m] = c[i,o^{-1}(i,m')] \exp(-j\varphi[i,o^{-1}(i,m')]),$$

where $\hat{b}[i,m]$ are the estimated complex symbols after undoing said scrambling operation.

The interleaver (72) accepts the complex spread symbols (70) from the previous DFT spreading block (32) as input, and applies the interleaving pattern o(i,m) in the time domain. A phase rotation (74) is applied over the interleaved symbols thus yielding the complex scrambled symbols (75) to be mapped on OFDM time-frequency resources.

Other scrambling operations are also possible depending on implementation needs, provided that they significantly reduce the correlations between the complex symbols that result from the DFT spreading operation in the time domain.

Scrambling as shown above will play the role of "whitening" the complex symbol sequences prior to mapping to time-frequency resources, thus appearing as random noise. Referring to FIG. 7, different coordination clusters will be characterized by different interleaving patterns o(i,m) and phase rotations $\varphi[i,m]$, while all the cells within a cluster will perform identical scrambling operations. This preserves orthogonality of the transmissions within the cluster, while transmissions from other clusters will appear as random noise and will not present a significant concentration of energy after de-spreading. Similarly, interference from uncoordinated cells will appear as random noise at the receiver.

When a desired signal from a cell within a coordination cluster is received by a user and if the signal is corrupted by interference from another cell, several situations may arise:

If the interfering signal comes from another cell belonging to the same coordination cluster, it will be characterized by a similar spreading procedure but different coordination patterns $\{k'_i\}$. If both sets of coordination patterns $\{k_i\}$ and $\{k'_i\}$ are orthogonal, the received symbols will appear at non-overlapping positions in the time domain after de-spreading therefore avoiding interference.

If the interfering signal comes from another cell belonging to a different coordination cluster, after undoing the scrambling and spreading operations interference will appear as random noise over the M TTIs, while the desired signal's SNR will be boosted by a factor M. Interference from other clusters will therefore be less harmful than in prior art techniques by a factor equal to 10 log M dB on average.

If the interfering signal comes from another cell not belonging to any coordination cluster, the de-spreading operation at the receive side will reinforce the desired signal's SNR but interference will remain as random noise thus limiting its influence.

These possible application cases emphasize a fundamental difference of the invention compared to other prior art techniques. The present invention introduces a mechanism to make transmissions orthogonal within a coordination cluster, while simultaneously protecting the desired signal against interferences from other clusters OF even from other uncoordinated cells. Hence the effect of inter-cluster interference is not as significant as in prior art techniques. In addition, the increased SNR of the desired signal will not create increased interference towards cells outside the coordination cluster because the DFT-spreading operation spreads the energy over M TTIs and avoids an increased power spectral density at non-intended receivers.

The feasibility of the proposed technique in large clusters is ensured by simply increasing the coordination cluster size M, at the cost of an increased latency and reduced bit rate. In general it will be possible to find a trade-off between data rates, latency and coordination capabilities that gives the optimum cluster size for each situation.

Figure 8:
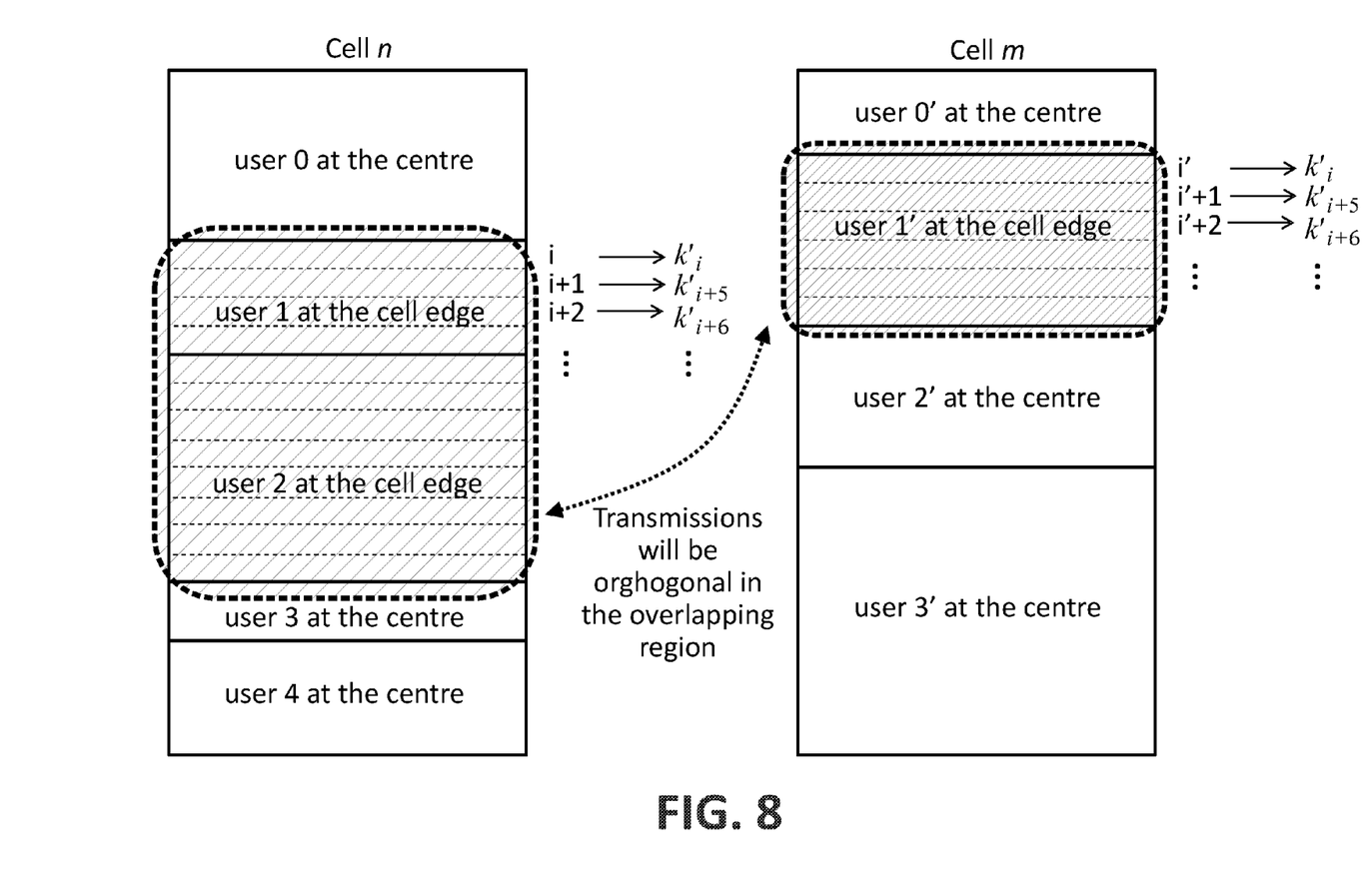
FIG. 8 shows a schematic diagram of two different cells from the same coordination cluster with cell-edge users whose transmissions are orthogonal in the overlapping frequency region, in accordance with a possible application case of the invention.

Coordination of the cells within a cluster does not imply that all transmissions should conform to the proposed precoding procedure. Only those transmissions intended for cell-edge users are candidates to the mechanism proposed in this invention. The scheduler within each base station is responsible of applying it or not depending on resources availability and other factors outside the scope of the present invention. This is illustrated in FIG. 8, where users in good radio conditions can be served with lower transmit power compared to cell-edge users. The latter ones undergo the proposed precoding mechanism, and by observing the coordination patterns of each cell as a function of the subcarrier index, transmissions from different cells remain orthogonal in the overlapping frequencies irrespective of the actual boundaries between allocated resources.

Upon application of the proposed precoding technique, the base stations can also send a control indication to the users notifying the particular structure employed for the transmission, including involved information such as the coordination cluster size (M), pseudo-random pattern and randomizing pattern in use. This control indication is out of the scope of this invention.

Figure 9:
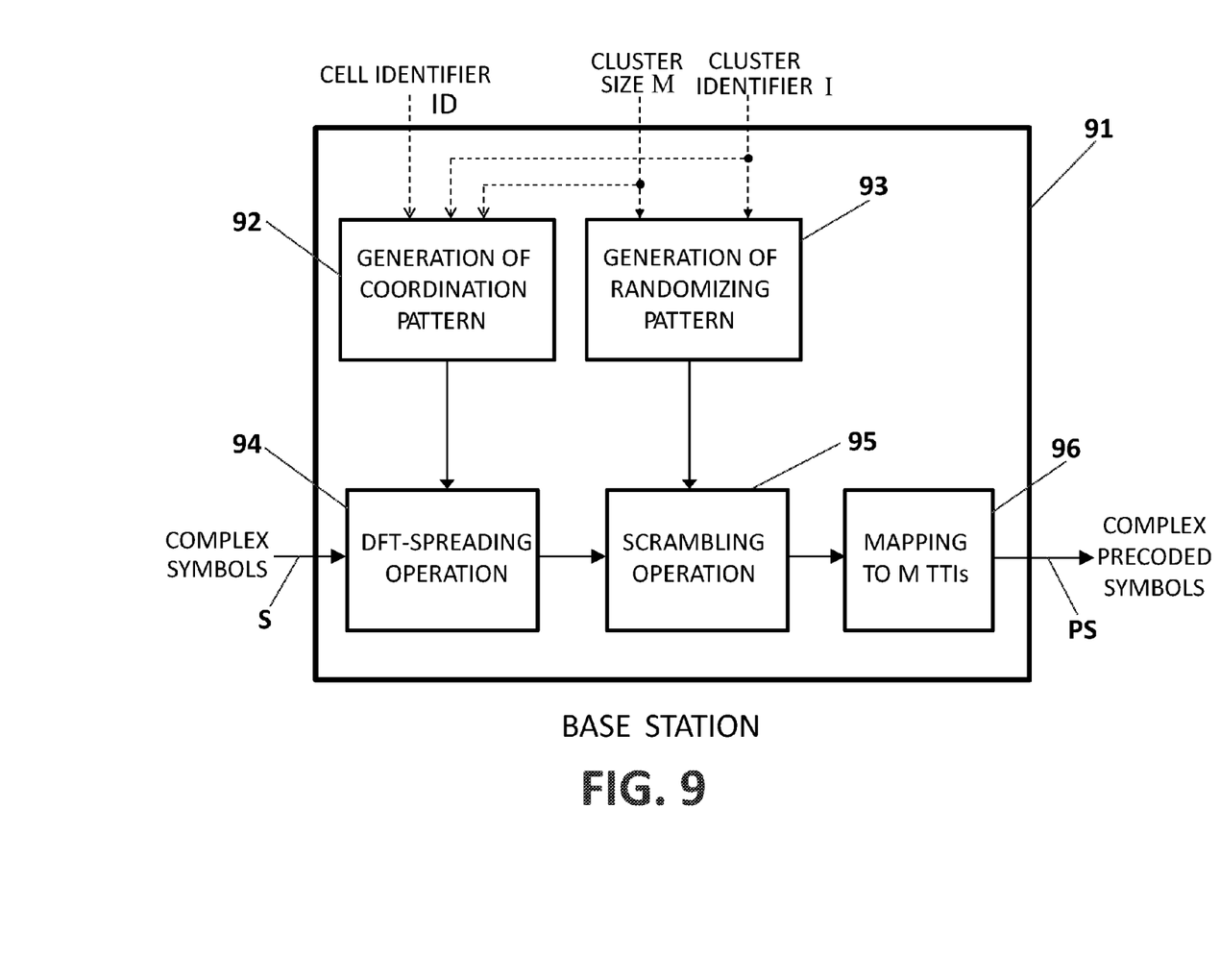
FIG. 9 shows a block diagram of the system architecture of a base station implementing the precoding of OFDM symbols for reducing inter-cell interference shown in FIG. 3, according to a possible embodiment of the invention

FIG. 9 depicts an exemplary embodiment for the proposed invention to be implemented in a base station (e.g., an LTE eNodeB) belonging to a coordination cluster. The proposed base station (91), for which transmissions are to be coordinated within the coordination cluster, comprises a first generator (92) of the coordination pattern to be used for the spreading operation according to the cluster size (M), the cluster identifier (I) and the cell identifier (ID) as configured by the OSS. The cluster identifier can be any suitable convention that identifies the dusters over a given deployment area. The proposed base station (91) further comprises a second generator (93) which generates the randomizing pattern to be used by all cells in the cluster for the scrambling operation. The scrambling operation also depends on the cluster size and cluster identifier. A DFT-spreading operation over the complex information symbols (S) is performed by a spreader (94) and a scrambler (95) applies the scrambling operation, thus resulting in a set of complex symbols to be protected against interference according to the principles described in the invention. Finally a mapping (96) of the symbols to M consecutive TTIs block is performed, thus resulting in the complex precoded symbols (PS) to be transmitted.

Figure 10:
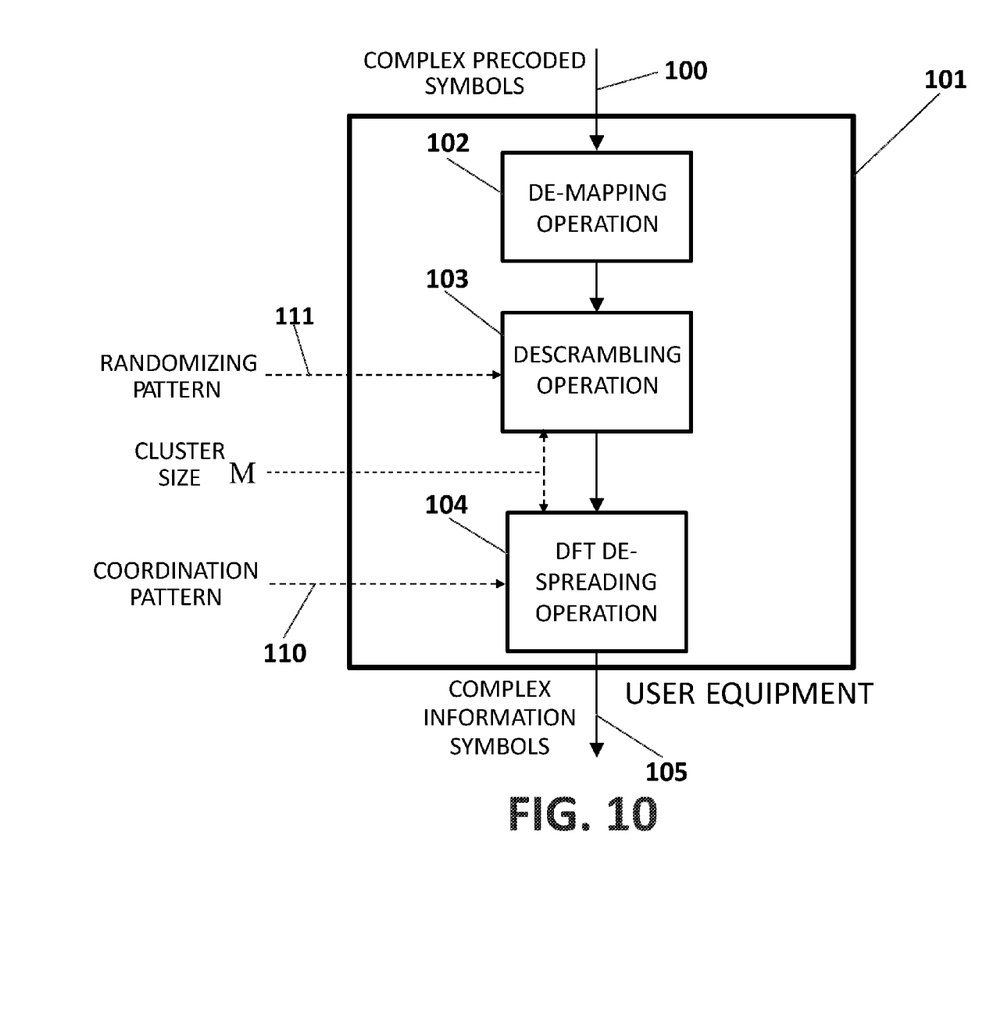
FIG. 10 shows a block diagram of the system architecture of an interfered user device undoing the precoding operations performed in FIG. 3, according to a possible embodiment of the invention.

FIG. 10 illustrates another embodiment for application of the proposed invention in a user device. The user equipment (101) first receives appropriate signalling information regarding the coordination pattern (110) and randomizing patterns (111) in use, as well as the cluster size (M). This control information may be received by means of suitable control or broadcast channels from the base station. With this information, the user equipment (101) first performs a de-mapping operation (102) wherein complex symbols (100) from M consecutive TTIs are collected for each of the subcarriers. A de-scrambling operation (103) is then performed that reduces interference from other clusters or uncoordinated cells, followed by a DFT de-spreading operation (104) that removes intra-cluster interference, thus resulting in the complex information symbols (105) which were transmitted.

The proposed embodiments can be implemented as a collection of software elements, hardware elements, firmware elements, or any suitable combination of them.

Note that in this text, the term "comprises" and its derivations (such as "comprising", etc.) should not be understood in an excluding sense, that is, these terms should not be interpreted as excluding the possibility that what is described and defined may, include further elements, steps, etc.

The invention claimed is:

1. A method for reducing interferences in Orthogonal Frequency Division Multiplexing wireless networks, the method comprising:

from multiple base stations of a Orthogonal Frequency Division Multiplexing network, transmitting a number N of subcarriers and a number T of complex symbols in a time transmission interval;

and the method being characterized by further comprising:

grouping a plurality of cells, which a user equipment communicating with at least one of the multiple base stations belong to, into coordination clusters defined as non-overlapping sets of cells, wherein each cluster comprises a number of cells whose transmissions are synchronized in the time domain;

generating, for each of the coordination clusters, a set of pseudo-random coordination patterns $\{k_i^n; i=0, \ldots, N-1; n=0, \ldots, M-1\}$, wherein $k_i^n$ are integers from 0 to M−1, M is the number of cells in the coordination cluster, N is the number of subcarriers, n is a cell identifier within the coordination cluster, and $k_i^n \neq k_i^m \forall n \neq m, i=0, \ldots, N-1$;

generating, for each of the coordination clusters, a randomizing pattern common to all cells within the coordination cluster, the randomizing pattern comprising an invertible transformation of the complex symbols in the time domain along M consecutive transmission time intervals for each subcarrier;

applying, by each cell within the coordination cluster, a spreading operation of the complex symbols over M consecutive transmission time intervals for each subcarrier according to the expression:

$$b[i,m] = M \sum_{n=0}^{T-1} a[i,n] \exp[-j2\pi(Mn+k_i) \cdot m/(M \cdot T)],$$

wherein a[i,n] denotes the complex symbols prior to the spreading operation, b[i,m] denotes the complex symbols after the spreading operation, $k_i$ are integers comprising the coordination pattern of the cell with $0 \leq k_i \leq M-1$, and i,m are indices given by $i=0, \ldots, N-1$, $m=0, \ldots, T \cdot M-1$;

applying, by each cell within the coordination cluster; an invertible scrambling operation of the spread complex symbols b[i,m] over M consecutive transmission time intervals in the time domain for each subcarrier, the scrambling operation being given by the randomizing pattern and common to all the cells within the coordination cluster, wherein the combined operations, when undone by a receiver, will lead to orthogonal reception of the signals from the cells within the coordination cluster, thus avoiding inter-cell interference; and mapping the scrambled complex symbols over all the N subcarriers in the frequency domain and M consecutive transmission time intervals in the time domain, obtaining precoded complex symbols after the spreading operation and the scrambling operation which are mapped on M·T consecutive resources in the time domain for each subcarrier.

2. The method according to claim 1, wherein the randomizing pattern comprises an invertible transformation of the complex symbols which is selected from permutations, phase rotations and any invertible transformation in the time domain according to a pseudo-random pattern.

3. The method according to claim 1, wherein the scrambling operation comprises an interleaver pattern o(i,m) and a phase rotation pattern φ[i,m] which are dependent upon the coordination cluster according to the following expression:

$$c[i,m'] = b[i,o(i,m)] \exp(j\varphi[i,m'])$$

wherein m and o(i,m) are integers from 0 to M·T−1, i= 0, ..., N−1, b[i,m] are the complex symbols after the spreading operation, m'=o(i,m), and c[i,m'] are the complex symbols after the scrambling operation.

4. The method according to claim 1, wherein grouping the plurality of cells into coordination clusters comprises:
  selecting a first pseudo-random coordination pattern $k_i^0$ to be applied by a first cell from the plurality of cells;
  selecting a second pseudo-random coordination pattern $k_i^1$ to be applied by a second cell from the plurality of cells, being $k_i^0 \neq k_i^1 \forall i=0, \ldots, N-1$;
  repeating the previous two steps of generating pseudo-random coordination pattern for the remaining cells in the coordination cluster, the pseudo-random coordination pattern $k_i^n$ selected for cell n<M−1 fulfilling the relation:

$$k_i^n \neq k_i^m \forall m<n, i=0, \ldots, N-1.$$

5. The method according to claim 1, wherein generating the set of pseudo-random coordination patterns is dependent on the cell identities of the cells of the coordination cluster.

6. The method according to claim 1, further comprising sending a control indication from the base stations to the user equipment which belongs to any of the cells of the coordination cluster, the control indication containing information about the size M of the coordination cluster, each generated pseudo-random coordination pattern $\{k_i^n; i=0, \ldots, N-1\}$ and the generated randomizing pattern used by the cell to which the user equipment belongs.

7. The method according to claim 1, further comprising applying, by the user equipment, the following inverse transformation to undo the scrambling operation:

$$\hat{b}[i,m] = c[i,o^{-1}(i,m')] \exp(-j\varphi[i,o^{-1}(i,m')]),$$

wherein $o^{-1}(i,m)$ denotes the inverse of said interleaver pattern, $\hat{b}[i,m]$ are the estimated complex symbols after undoing the scrambling operation (34), m'=o(i,m), and c[i,m] are complex symbols received by the user equipment.

8. A method according to claim 1, further comprising applying, by the user equipment, the following inverse transformation to obtain estimated complex symbols â[i,n] after undoing the spreading operation with a signal to noise ratio improved by a factor M:

$$\hat{a}[i,n] = \sum_{n=0}^{M \cdot T-1} \hat{b}[i,m] \exp[j2\pi(Mn+k_i) \cdot m/(M \cdot T)],$$

wherein $\hat{b}[i,m]$ are the estimated complex symbols after undoing the scrambling operation.

* * * * *